(12) United States Patent
Hauge et al.

(10) Patent No.: US 8,596,466 B2
(45) Date of Patent: Dec. 3, 2013

(54) PRODUCTION OF SINGLE-WALLED CARBON NANOTUBE GRIDS

(75) Inventors: Robert H. Hauge, Houston, TX (US); Ya-Qiong Xu, Houston, TX (US); Sean Pheasant, Costa Mesa, CA (US)

(73) Assignee: William Marsh Rice University, Houston, TX (US)

( * ) Notice: Subject to any disclaimer, the term of this patent is extended or adjusted under 35 U.S.C. 154(b) by 681 days.

(21) Appl. No.: 12/439,865

(22) PCT Filed: Sep. 11, 2007

(86) PCT No.: PCT/US2007/078179
§ 371 (c)(1),
(2), (4) Date: Sep. 8, 2010

(87) PCT Pub. No.: WO2008/079465
PCT Pub. Date: Jul. 3, 2008

(65) Prior Publication Data
US 2010/0320141 A1      Dec. 23, 2010

Related U.S. Application Data

(60) Provisional application No. 60/843,612, filed on Sep. 11, 2006, provisional application No. 60/888,734, filed on Feb. 7, 2007.

(51) Int. Cl.
*B01D 69/02* (2006.01)
*B01D 71/02* (2006.01)

(52) U.S. Cl.
USPC ...... 210/500.22; 210/503; 210/505; 427/180; 977/742; 977/750; 977/902; 977/891; 977/895

(58) Field of Classification Search
None
See application file for complete search history.

(56) References Cited

U.S. PATENT DOCUMENTS

| | | | |
|---|---|---|---|
| 5,861,094 A | 1/1999 | Goehde | |
| 6,835,366 B1 * | 12/2004 | Margrave et al. | 423/447.2 |
| 6,858,197 B1 | 2/2005 | Delzeit | |
| 2003/0012722 A1 | 1/2003 | Liu | |
| 2004/0164327 A1 | 8/2004 | Shin et al. | |
| 2005/0151214 A1 | 7/2005 | Gole et al. | |
| 2005/0193800 A1 | 9/2005 | DeBoer et al. | |
| 2005/0263456 A1 | 12/2005 | Cooper et al. | |
| 2007/0039858 A1 * | 2/2007 | Noca et al. | 210/94 |
| 2007/0098621 A1 * | 5/2007 | Margrave et al. | 423/447.2 |

FOREIGN PATENT DOCUMENTS

DE       101 35 504 A1    3/2004

OTHER PUBLICATIONS

English machine translation of DE 10135504A1 (2003).*
Lin, et al., "Selective growth of horizontally-oriented carbon nanotube bridges on patterned silicon wafers by electroless plating Ni catalysts", Diamond and Related Materials, 14:2005, pp. 1867-1871.

(Continued)

*Primary Examiner* — Krishnan S Menon
(74) *Attorney, Agent, or Firm* — Winstead PC

(57) ABSTRACT

A method of forming a nanotube grid includes placing a plurality of catalyst nanoparticles on a grid framework, contacting the catalyst nanoparticles with a gas mixture that includes hydrogen and a carbon source in a reaction chamber, forming an activated gas from the gas mixture, heating the grid framework and activated gas, and controlling a growth time to generate a single-wall carbon nanotube array radially about the grid framework. A filter membrane may be produced by this method.

9 Claims, 2 Drawing Sheets

(56) References Cited

OTHER PUBLICATIONS

Gao, et al., "Large-Scale Fabrication of Aligned Single-Walled Carbon Nanotube Array and Hierarchical Single-Walled Carbon Nanotube Assembly", J. Am. Chem. Soc., 126:2004, pp. 16698-16699.

Han, et al., "Template-Free Directional Growth of Single-Walled Carbon Nanotubes on a- and r-Plane Sapphire", J. Am. Chem. Soc., 127:2005, pp. 5294-5295.

Rueckes, et al., "Carbon Nanotube-Based Nonvolatile Random Access Memory for Molecular Computing", Science, 289:2000, pp. 94-97.

Chung, et al., "Toward Large-Scale Integration of Carbon Nanotubes", Langmuir, 20:2004, pp. 3011-3017.

Ren, et al., "Progress on Production of Carbon Nanotubes", 32nd International SAMPE Technical Conference, Nov. 5-9, 2000.

Hata, et al., "Water-Assisted Highly Efficient Synthesis of Impurity-Free Single-Walled Carbon Nanotubes", Science, 306:2004, pp. 1362-1364.

Huang, et al., "Ultralong, Well-Aligned Single-Walled Carbon Nanotube Architectures on Surfaces", Adv. Mater., 15:2003, pp. 1651-1655.

Ismach, et al., "Orthogonal Self-Assembly of Carbon Nanotube Crossbar Archiectures by Simultaneous Graphoepitaxy and Field-Directed Growth", Nano. Lett., 6:2006, pp. 1706-1710.

Xu, et al,, "Vertical Array Growth of Small Diameter Single-Walled Carbon Nanotubes", J. Am.Chem. Soc., 128:2006, pp. 6560-6561.

Xu, et al., "Effects of atomic hydrogen and active carbon specie in 1 mm vertically aligned single-walled carbon nanotube growth", Appl. Phys. Lett., 89:2006, pp. 1231161-1231163 (Sep. 21, 2006).

Su, et al., "Lattice-Oriented Growth of Single-Walled Carbon Nanotubes", J. Phys. Chem. B, 104:2000, pp. 6505-6508.

Huang, et al., "Growth of Millimeter-Long and Horizontally Aligned Single-Walled Carbon Nanotubes on Flat Surfaces", J. Am. Chem, Soc., 125:2003, pp. 5636-5637.

Johnson, et al., "IBM grows nanotube patterns on silicon wafers", EETimes online publication, Sep. 30, 2002.

Basgall, "Unusually Long 'Buckytubes' Grown at Duke", Duke University Office of News and Communications online publication, Apr. 22, 2003.

Long, aligned 'buckytubes' grown, The Hindu online publication, May 15, 2003.

International Search Report and Written Opinion for PCT/US2007/078179, mailed Jul. 8, 2008.

* cited by examiner

PRODUCTION OF SINGLE-WALLED CARBON NANOTUBE GRIDS

CROSS-REFERENCE TO RELATED APPLICATIONS

This application claims priority to U.S. Provisional Application Nos. 60/843,612 filed Sep. 11, 2006 and 60/888,734 filed Feb. 7, 2007, both of which are incorporated by reference herein in their entirety.

STATEMENT OF FEDERALLY SPONSORED RESEARCH

This invention was made with government support under Grant No. DOE-DE-Ac05-000R22725, awarded by the U.S. Department of Energy, and Grant No. AFRL-F33615-01-D5802, awarded by the U.S. Department of Defense. The government has certain rights in the invention.

BACKGROUND

Carbon nanotubes are nanoscale high-aspect-ratio cylinders consisting of hexagonal rings of carbon atoms that may assume semi-conducting and conducting electronic states. Carbon nanotubes typically range from a few to tens of nanometers in diameter and tens to hundreds of nanometers in length. Because of their unique structure, carbon nanotubes have a conductivity far greater than of a typical copper interconnect. Further, with respect to heat conduction, the carbon nanotube has a conductivity about ten times higher than copper.

Many methods exist for forming and/or creating nanotubes. A conventional method of forming carbon nanotubes utilizes a chemical vapor deposition (CVD) process. Specifically, the CVD process directs a flow of a carbonaceous reactant to a catalyst material located on the substrate, where the reactant is catalyzed to synthesize carbon nanotubes. Commonly used carbonaceous materials used for the construction of carbon nanotubes include materials such as activated carbon, carbon black, carbon fiber cloth, highly oriented pyrolytic graphite, graphite powder, graphite cloth, glassy carbon, carbon aerogel, and the like. The carbon nanotubes are capable of being lengthened by insertion of activated carbon atoms at the interface with the catalyst material. Typically, the carbon nanotubes are then collected for an end use or further processing.

In designing components for electronic, optical, and other applications, for example, it is desirable to control the lengths, diameters, and types of carbon nanotubes produced. Additionally, it would be beneficial to build on the paucity of methods available to control the overall three dimensional architecture of carbon nanotube arrays.

SUMMARY

Various embodiments disclosed herein relate to methods of fabricating nanotube arrays and, more particularly, to methods of producing single-walled carbon nanotube grids.

In one aspect, the present disclosure relates to a method for assembling nanotubes grids, which includes placing a plurality of catalyst nanoparticles on a grid framework, contacting the catalyst nanoparticles with a gas mixture that includes hydrogen and a carbon source in a reaction chamber, forming an activated gas from the gas mixture, heating the grid framework and activated gas, and controlling a growth time to generate a single-wall carbon nanotube array radially about the grid framework.

In another aspect, the present disclosure provides a filter membrane that includes a grid framework and a plurality of single-wall carbon nanotubes disposed radially about the grid framework.

The foregoing has outlined the features of the present invention in order that the detailed description of the invention that follows may be better understood. Additional features and advantages of the invention will be described hereinafter which form the subject of the claims of the invention.

BRIEF DESCRIPTION OF THE FIGURES

In order that the manner in which the above-recited and other enhancements and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE INVENTION

Figure 1:
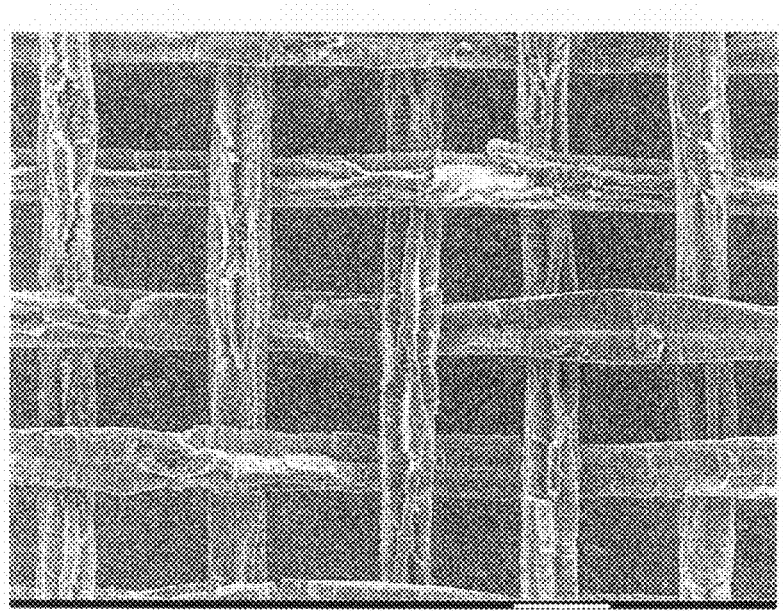
FIG. 1 is a Scanning Electron Microscope (SEM) image of a nanotubes grid at 100 microns.

In some embodiments, the present disclosure provides a novel method for growing single-walled carbon nanotube (SWNT) grids. The SWNT grids include a grid framework from which single-walled carbon nanotubes with relatively small diameter are grown radially outward. Broadly, the method includes placing a plurality of catalyst nanoparticles on the grid framework, contacting the catalyst nanoparticles with a gas mixture that includes hydrogen and a carbon source in a reaction chamber, forming an activated gas from the gas mixture, heating the grid framework and activated gas, and controlling a growth time to generate a single-wall carbon nanotube array radially about the grid framework.

The grid framework may be made of any material that can support temperatures for carbon nanotubes growth. In one embodiment the grid framework is a metal. For example, the grid framework may be aluminum, aluminum oxides, alloys and the like. The grid framework need not be metallic. For example, it may be made of silicon, silicon oxides, positively or negatively doped silicon, and the like, any of which may be useful in various electronic applications.

The grid framework disclosed herein may take on any shape for an individual unit cell including, for example, square, rectangular, and triangular grids. Individual cells within the grid framework having square/rectangular dimensions may range in size from about 100 nm to about 1000 nm in one embodiment or from about 1 microns to about 500 microns, in another embodiment. One skilled in the art will recognize, however, that the size of the grid framework can be tailored appropriately depending on the application. Thus, grid frameworks with dimensions less than 100 nm and more than 500 microns are also viable.

In one embodiment, catalyst nanoparticles may be affixed to the grid framework by, for example, a vapor deposition method, such as, but not limited to chemical vapor deposition (CVD). Catalyst nanoparticle placement can produce clusters of catalyst on the grid framework, individual atoms of catalyst on the grid framework, and the like. Catalyst nanoparticles may be affixed to the grid framework by any method common in the art. The catalyst nanoparticles may include, for example, iron, molybdenum, cobalt, nickel, and copper. Any metal capable of promoting SWNT growth may be used.

The catalyst nanoparticles disposed on the grid framework may range in size from about 0.5 nanometers to about 10 nanometers. In various embodiments, the size of the catalysts at least partially determines the resulting size of the grown single-walled carbon nanotube.
Accordingly, a process desiring a nanotube of diameter less than 1 nm should use a catalyst, such as a metal catalyst, with a diameter less than 1 nm. In this manner, a design characteristic for the grown SWNT is the diameter and/or size of the catalyst and process and/or product can be varied by varying catalyst size.

The growth conditions for generating SWNTs allow for the use of a broad array of gas mixtures. Various carbon feedstock sources are available for SWNT growth. In one embodiment, the carbon source may be a hydrocarbon. Such hydrocarbons may include, for example, acetylene, ethylene, methanol, ethanol ethane, and acetone.

In one embodiment, the gas mixture comprises at least one carbon source, although more than one carbon source may be used. In one embodiment, the gas mixture has at least one non-carbon containing constituent along with the carbon source. For example, it has come to the fore that SWNT growth benefits from the presence of an oxygen source. The oxygen source may be, for example, water, carbon dioxide, molecular oxygen, or the like. Another component that may be added to the gas mixture for SWNT growth is hydrogen. Hydrogen may be supplied in molecular form. Hydrocarbons provide a good source of both carbon and hydrogen, upon activation. Suitable hydrocarbons include also include, for example, paraffin's, olefins, ringed structures, branched structures, and hydrocarbon with functional groups. The gas mixture and the grid framework bearing the catalyst nanoparticles may be heated in a reaction chamber from about room temperature to a temperature sufficient to produce single-walled carbon nanotubes. In one embodiment, the gas mixture is heated prior to contacting the catalyst nanoparticles. In general, heating of the gas and/or grid framework activates the gas. In an alternate embodiment, the grid framework is preheated prior to introduction of the gas. Without being bound by the mechanism, in various embodiments, the activation of the gas mixture produces a mixture of atomic hydrogen and various hydrocarbons. Generally, any mixture of atomic hydrogen and a hydrocarbon will work. However, in various embodiments, gas activation by any given method, such as gas discharges that produce atomic hydrogen in significant amounts, in combination with heating of a nanotube growth grid framework in the presence of the activated atomic hydrogen is capable of forming a small diameter single wall carbon nanotube, depending at least upon the size of the catalyst. In various embodiments, the percentage of activated gas is capable of being varied.
In an embodiment, a large portion of the reaction chamber comprises activated gas. In an embodiment, the contents of the volume of the reaction chamber is at least 90% activated gas. In an alternate embodiment, the contents of the volume of the reaction chamber is at least 75% activated gas. In an alternate embodiment, the contents of the volume of the reaction chamber is at least 65% activated gas. In an alternate embodiment, the contents of the volume of the reaction chamber is at least 50% activated gas. In an alternate embodiment, the contents of the volume of the reaction chamber is at least 35% activated gas. In an alternate embodiment, the contents of the volume of the reaction chamber is at least 25% activated gas. In an alternate embodiment, the contents of the volume of the reaction chamber is at least 5% activated gas. In general, any percentage component of activated gas is capable of use with varying embodiments.

In various embodiments, the grid framework and the gas mixture are heated together. In an embodiment, the grid framework and gas mixture are heated from about room temperature to a final temperature. Various methods of heating can be used. For example, a hot filament can be used for heating.

For embodiments utilizing hot filaments, temperatures of the filaments may range from about 100° C. to about 6000° C. However, generally the filament may be any temperature capable of activating at least one of the components comprising the mixture. In an embodiment, a hot filaments is at a temperature greater than about 2000° C. and generally temperatures greater than about 600° C. have also shown to be effective at activating a gas of the present invention. In an embodiment, a temperature between about 125° C. and about 4000° C. is used. In an alternate embodiment, a temperature between about 150° C. and about 2000° C. is used. In an alternate embodiment, a temperature between about 200° C. and about 1500° C. is used. In an alternate embodiment, a temperature between about 250° C. and about 1000° C. is used. In an alternate embodiment, a temperature between about 300° C. and about 900° C. is used. In an alternate embodiment, a temperature between about 400° C. and about 750° C. is used. In an alternate embodiment, a temperature between about 500° C. and about 600° C. is used. However, in general, any temperature can be used. The exact temperature may be selected depending on the exact constituents of the gas mixture and the nature of the catalyst nanoparticles in use. In an embodiment it is desired to use a lower temperatures to prevent and/or hinder nanotube aggregation, which is known to occur at elevated temperatures.

Additionally, SWNT growth is also dictated by the pressure of the reaction chamber. In one embodiment, the reaction chamber is below atmospheric pressure. In various embodiments disclosed herein, different pressures can be used in a reaction chamber. In an embodiment, the reaction chamber is at about atmospheric pressure. In an alternate embodiment, a sub-atmospheric pressure is maintained in the reaction chamber. In an alternate embodiment, a hyper-atmospheric pressure is maintained in the reaction chamber. In yet an alternate embodiment, a vacuum is maintained in the reaction chamber. Generally, any pressure may be used with various embodiments of the present invention depending upon the feed stock, catalysts, and other elements in the system.

In various embodiments, the pressure and temperature can be varied dependently, such that one is dependent upon the other, such that a temperature and pressure are capable of being varied during process optimization. In an alternate embodiment, the pressure and temperature are independent.

The time period over which the nanotubes are allowed to grow will affect the nanotube grid characteristics, for example, the pore size. As the nanotubes grow outward radially, the size of the pore decreases as the void space of the grid framework fills with the nanotubes structure. Controlling the time of SWNT growth gives the user a means to control a wide variety of pore sizes from the nanoscale through micron scale.

Using the SWNT growth techniques described above, well defined nanoporous membranes may be constructed. Thus, in one embodiment, a filter membrane may be provided in which the core is a grid framework and a plurality of single-wall carbon nanotubes disposed radially about the grid framework help define the pore dimensions.

In one embodiment an average pore dimension of the filter membrane may range from about 1 nm by 1 nm to about 100 microns by 100 microns. In another embodiment an average pore dimension may range from about 0.5 nm to about 100 nm. In yet another embodiment the average pore size may range from about 1 microns to about 10 microns. As described above, starting with a grid of known dimensions and by controlling the time of SWNT growth one can exert control over the pore size of a filter membrane.

EXAMPLE

The following example is included to demonstrate particular embodiments of the present disclosure. It should be appreciated by those of skill in the art that the method disclosed in the example that follows merely represent an exemplary embodiment of the present disclosure. However, those of skill in the art should, in light of the present disclosure, appreciate that many changes can be made in the specific embodiments described and still obtain a like or similar result without departing from the spirit and scope of the present disclosure.

Figure 2:
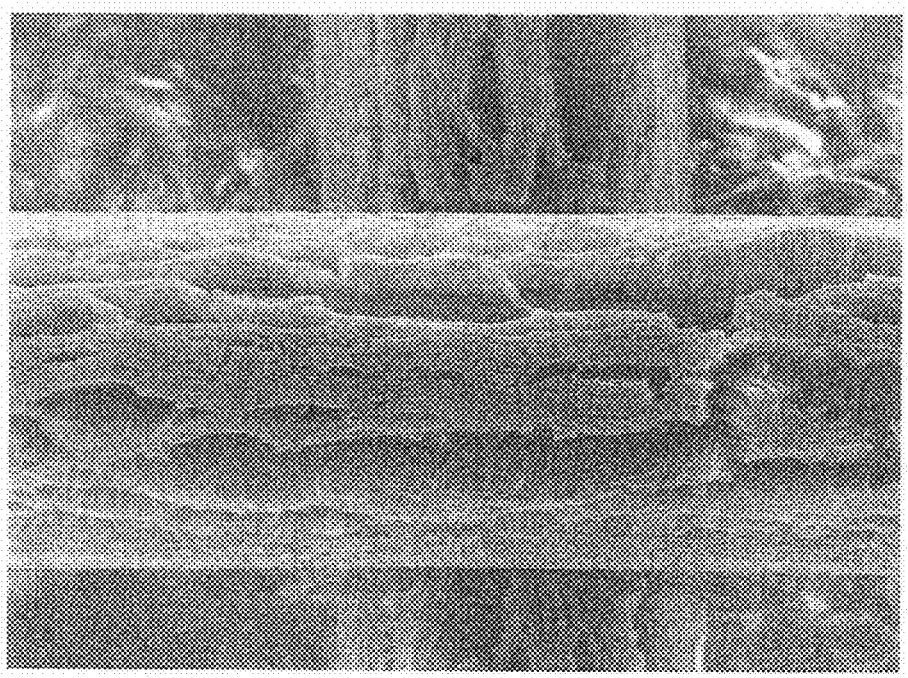
FIG. 2 is an SEM image of a junction of the nanotubes grid of FIG. 1 at 10 microns.

A nanotube grid was formed using 400 sccm hydrogen and 2 sccm acetylene, with a hot filament at 750° C. for 20 minutes. FIG. 1 shows a Scanning Electron Microscope (SEM) image of the nanotubes grid at 100 microns formed under these conditions. FIG. 2 shows an SEM image close up of a junction of this nanotube grid at 10 microns.

Advantageously, the present disclosure provides methods for generating carbon nanotubes grids. These grids are relatively chemical resistant and may be conducting. The nanotube grids may provide useful filtration membranes, for example. Other applications of nanotubes grids may be apparent to one skilled in the art. For example, nanotubes grids may be useful in various electronic, magnetic, and optical devices, as well as in sensor and template applications.

Although the present disclosure has been described with reference to specific embodiments, these descriptions are not meant to be construed in a limiting sense. Various modifications of the disclosed embodiments, as well as alternative embodiments will become apparent to persons skilled in the art upon reference to the description. It will be understood that certain of the above-described structures, functions, and operations of the above-described embodiments are not necessary to practice such embodiments and are included in the description simply for completeness of an exemplary embodiment or embodiments. In addition, it will be understood that specific structures, functions, and operations set forth in the above and below described referenced patents and publications can be practiced in conjunction with various embodiments, but they are not essential. It is therefore to be understood that embodiments may be practiced otherwise than as specifically described without actually departing from the spirit and scope of the disclosure as defined by the appended claims. It is therefore contemplated that the claims will cover any such modifications or embodiments that fall within the true scope of the disclosure.

What is claimed is:

1. A method comprising:
   placing a plurality of catalyst nanoparticles on a metal grid framework;
      wherein the catalyst nanoparticles comprise iron, and
      wherein the metal grid framework comprises aluminum and a plurality of individual unit cells;
   forming an activated gas mixture,
      wherein the activated gas mixture comprises atomic hydrogen and a carbon source,
      wherein the atomic hydrogen in the activated gas mixture is formed by exposing molecular hydrogen to a hot filament, and
      wherein the hot filament is at a temperature of greater than about 2,000° C.;
   contacting the catalyst nanoparticles on the metal grid framework with the activated gas mixture,
      wherein the contacting step occurs in a reaction chamber;
   heating the metal grid framework and the activated gas mixture; and
   controlling a growth time to generate a single-wall carbon nanotube array radially about the metal grid framework.

2. The method of claim 1, wherein the catalyst nanoparticles range in size from about 0.5 nanometers to about 10 nanometers.

3. The method of claim 1, wherein each of the plurality of individual unit cells have dimensions ranging from about 100 nm to about 1000 nm.

4. The method of claim 1, wherein the carbon source comprises a hydrocarbon.

5. The method of claim 4, wherein the hydrocarbon is selected from the group consisting of acetylene and ethylene.

6. The method of claim 1, wherein the activated gas mixture and the metal grid framework are heated in the reaction chamber to a temperature sufficient to produce single-walled carbon nanotubes.

7. The method of claim 1, wherein a pressure of the reaction chamber is below atmospheric pressure.

8. The method of claim 1, wherein controlling the growth time affects a pore size of the metal grid framework.

9. The method of claim 1, wherein each of the plurality of individual unit cells have dimensions ranging from about 1 micron to about 500 microns.

* * * * *

UNITED STATES PATENT AND TRADEMARK OFFICE
CERTIFICATE OF CORRECTION

PATENT NO.       : 8,596,466 B2                                            Page 1 of 1
APPLICATION NO.  : 12/439865
DATED            : December 3, 2013
INVENTOR(S)      : Hauge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this
Twenty-second Day of September, 2015

Michelle K. Lee
*Director of the United States Patent and Trademark Office*